(12) United States Patent
Oh

(10) Patent No.: US 11,991,475 B2
(45) Date of Patent: May 21, 2024

(54) DISPLAYING TIME ZONE-SPECIFIC CONTENT IN VIDEO CONFERENCES

(71) Applicant: Zoom Video Communications, Inc., San Jose, CA (US)

(72) Inventor: Randy Oh, Dublin, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/514,839

(22) Filed: Oct. 29, 2021

(65) Prior Publication Data

US 2023/0138424 A1 May 4, 2023

(51) Int. Cl.
*H04N 7/15* (2006.01)

(52) U.S. Cl.
CPC ..................... *H04N 7/15* (2013.01)

(58) Field of Classification Search
CPC ......... H04N 7/15; H04N 7/147; H04L 65/403
USPC ........................................... 348/14.01–14.16
See application file for complete search history.

(56) References Cited

U.S. PATENT DOCUMENTS

| | | | |
|---|---|---|---|
| 2007/0070186 A1 * | 3/2007 | Fujimori | H04N 7/147 348/E7.083 |
| 2007/0171192 A1 * | 7/2007 | Seo | H04M 1/72427 345/531 |
| 2007/0274251 A1 * | 11/2007 | Hagihara | H04M 1/2745 370/328 |
| 2008/0032736 A1 * | 2/2008 | Bari | H04W 12/06 455/552.1 |
| 2021/0400142 A1 * | 12/2021 | Jorasch | H04L 65/403 |
| 2022/0070389 A1 * | 3/2022 | Tangeland | G06T 3/60 |

FOREIGN PATENT DOCUMENTS

| | | | | |
|---|---|---|---|---|
| EP | 1669920 A1 * | 6/2006 | ........ | G06Q 10/0631 |
| EP | 2571260 A1 * | 3/2013 | ........ | H04L 12/1818 |
| WO | WO-2008112001 A1 * | 9/2008 | ........ | H04L 12/1827 |

\* cited by examiner

*Primary Examiner* — Melur Ramakrishnaiah
(74) *Attorney, Agent, or Firm* — Kilpatrick Townsend & Stockton LLP

(57) ABSTRACT

One example method includes initiating a video conference by a video conference provider, receiving, at the video conference provider, a plurality of video streams associated with the video conference, receiving, at the video conference provider, a plurality of time zone indications, each of the plurality of time zone indications associated with one of the plurality of video streams, determining, by the video conference provider, a time zone-specific content associated with each of the plurality of time zone indications, and transmitting the plurality of video streams and associated time zone-specific content to a plurality of client devices.

20 Claims, 7 Drawing Sheets

DISPLAYING TIME ZONE-SPECIFIC CONTENT IN VIDEO CONFERENCES

FIELD

The present application generally relates to video conferencing and more particularly relates to displaying time zone-specific content in videoconferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
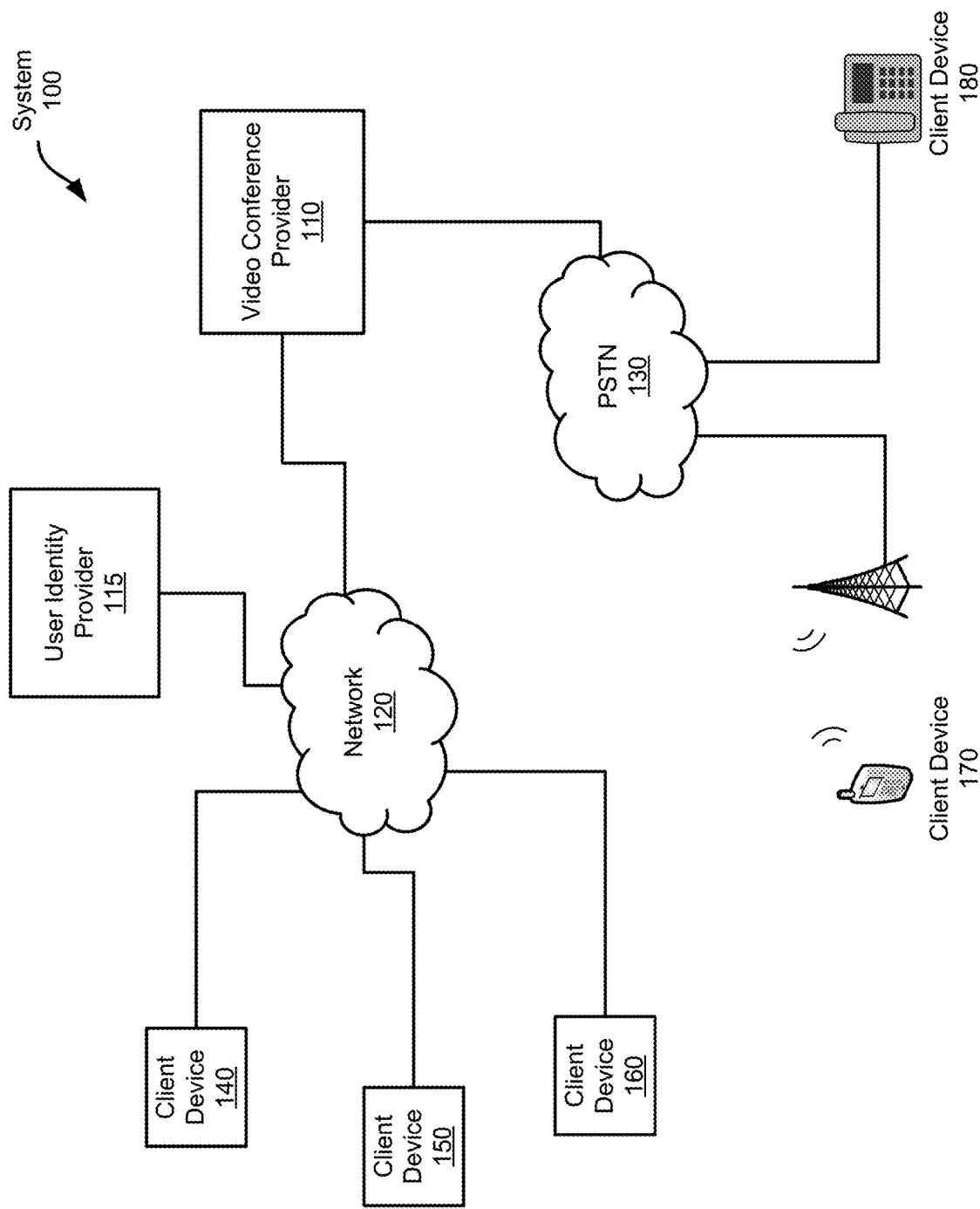
FIGS. 1-2 show example systems for displaying time zone-specific content in video conferences.

Examples are described herein in the context of displaying time zone-specific content in videoconferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During video conferences, participants use client software provided by their video conference provider to share data streams of video and audio (referred to collectively as "multimedia streams" or "video streams") to interact with each other. The use of video helps the participants more fully engage with each other and provides a more immersive virtual experience. Many video conferences are now global in nature. For example, companies may include workers in Asia, Europe, and the United States. Those workers often engage in video conferences as part of their daily routines.

One difficulty with the global nature of today's workforce is that it can be difficult for users to determine in which time zone other users are located. This can complicate scheduling or even basic interpersonal interactions, such as greeting one another, e.g., saying "good morning" to someone who is joining late at night. In conventional systems, users may use an internet search to quickly determine where the other users are located. But doing so can be awkward and impractical depending on the number of participants.

Example systems address this problem by having each video conference participant provide some indication of their local time zone. For example, the user might set a location with which a time zone is associated. This information is provided to the video conference provider. Then, when the video conference provider sends out the individual video streams, the video conference provider also provides some indication of the time zone. For example, the video conference provider might provide a numerical representation of the time zone, such as the difference in time between the time zone of the host of the video conference provider and each participant. Or alternatively, the time zone representation may be a difference between a current time and the time associated with coordinated universal time (UTC). The time zone indication can then be displayed at the user's client device. Or alternatively, can be used to determine other information, for example, whether it's light or dark or morning or night where other participants are located.

Such systems provide numerous advantages over conventional ways of determining the time zone of participants in video conferences. For example, for video conferences, such as webinars, the number of participants make it difficult to manually determine the local time of the participants. Also, in smaller video conferences, example systems help to alleviate the awkwardness of being unsure of the time zone in which the other participants are located. Such systems also allow easier scheduling of future video conferences since the host can determine the difference in time zones by examining the time zone indication provided with each of the current video streams.

This illustrative example is given to introduce the reader to the general subject matter discussed herein and the disclosure is not limited to this example. The following sections describe various additional non-limiting examples and examples of displaying time zone-specific content in videoconferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
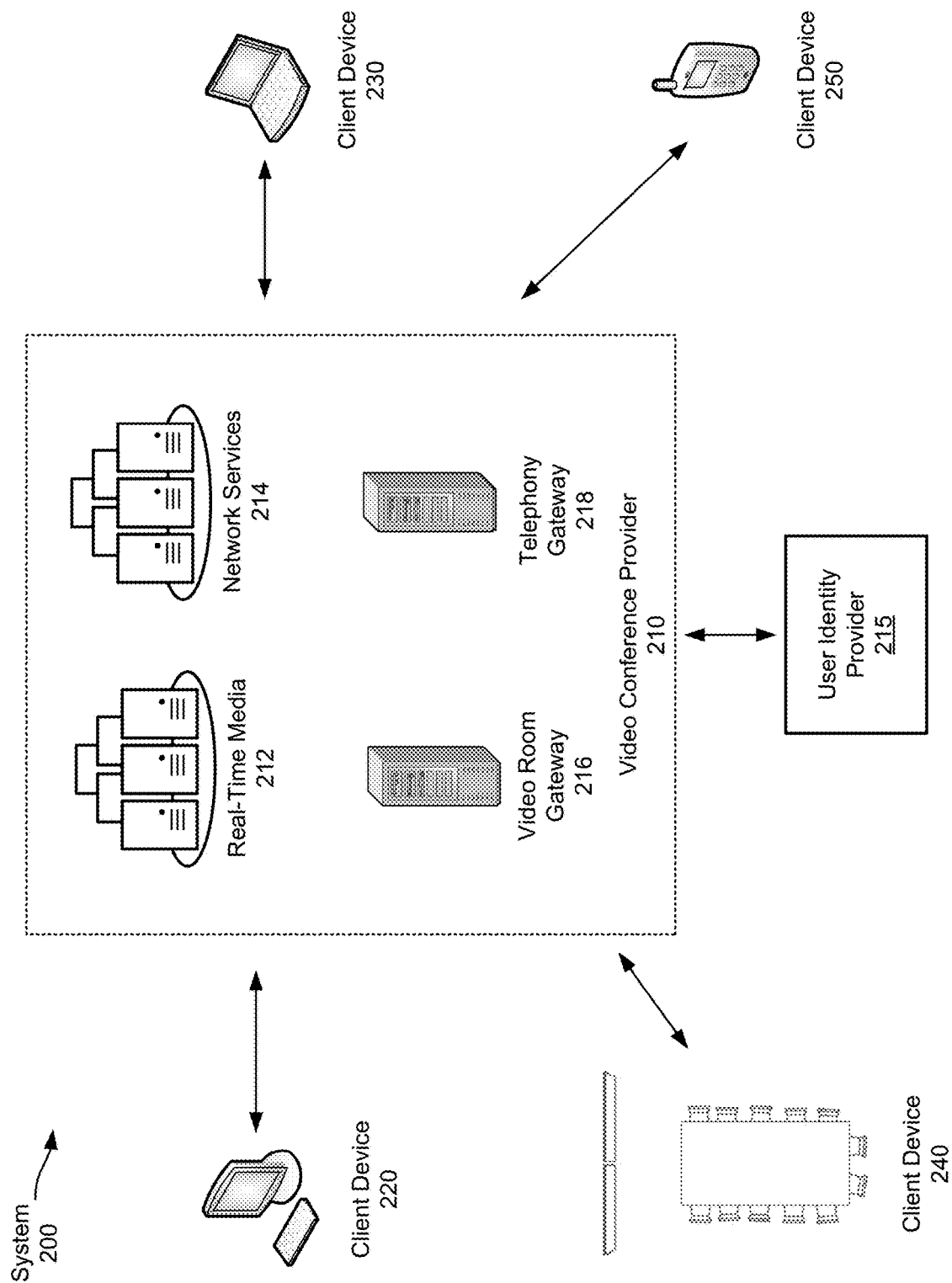

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210.

For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
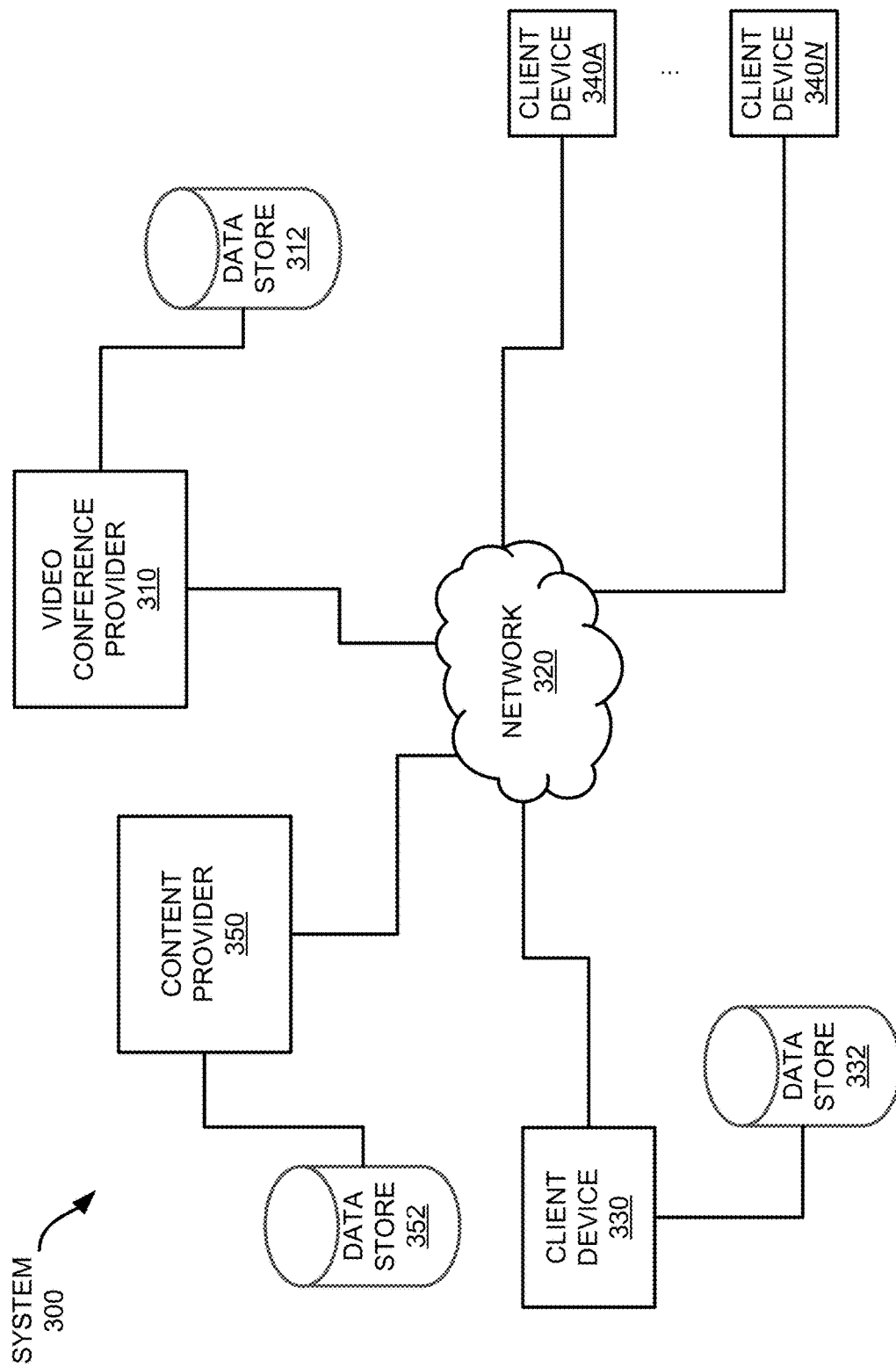
FIGS. 3A-3B show an example system and client device for displaying time zone-specific content in video conferences.
Figure 3B:
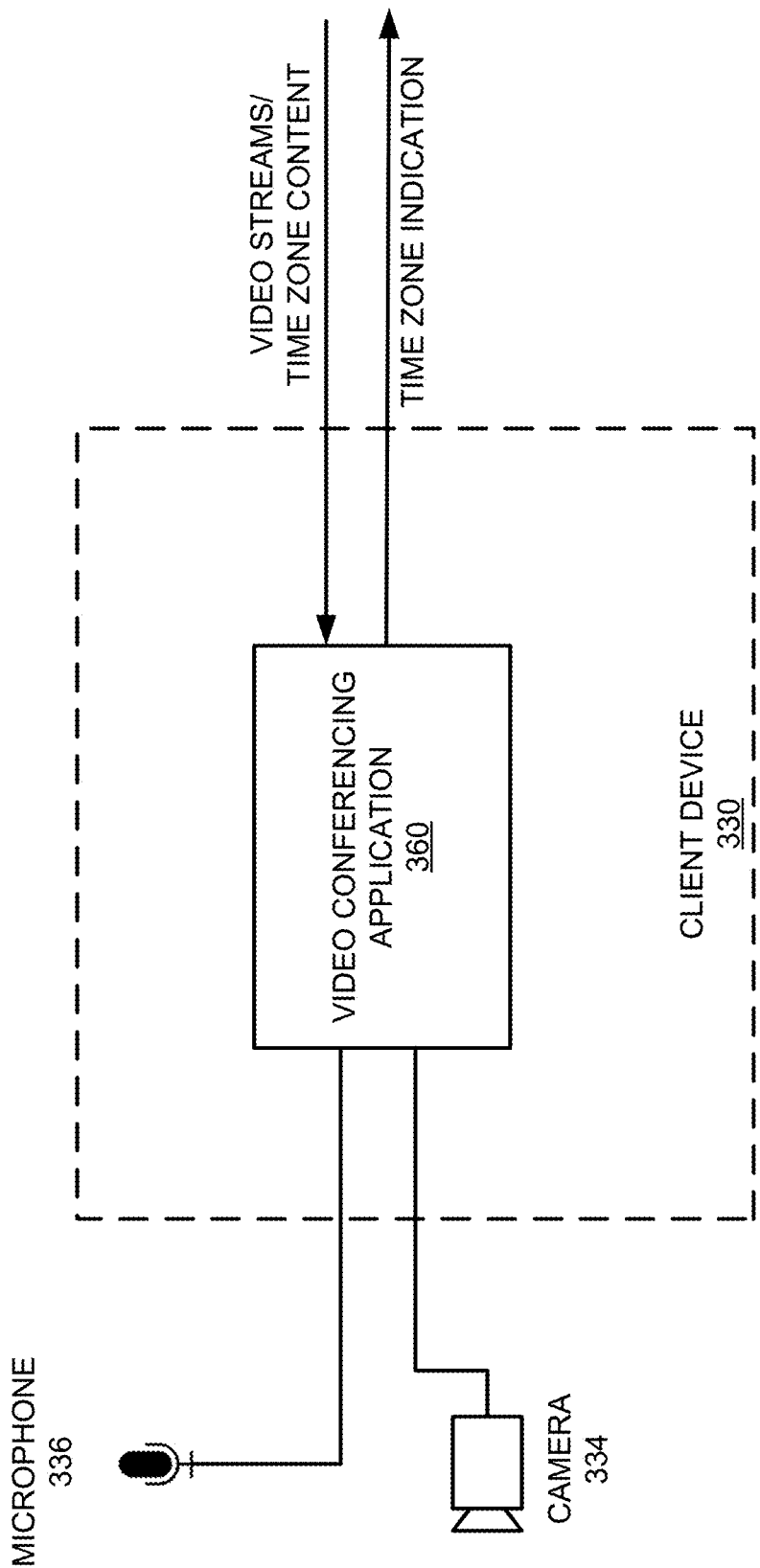

Referring now to FIGS. 3A-3B, FIG. 3A shows an example system 300 for displaying time zone-specific content in video conferences. The system 300 includes a video conference provider 310, multiple client device 330, 340a-n, and a content provider 350, which are connected to network 320, which may include one or more different public or private networks, such as the internet. The client devices 330, 340a-n in this example are connected to the video conference provider 310 and are participating in a video conference. The user of client device 330 executes a video conferencing application 360, shown in FIG. 3B, which connects to the video conference provider 310 to join the video conference. As a part of connecting to the video conference, the video conferencing application 360 activates the client device's camera 334 and microphone 336 to capture video and audio streams.

To display time zone-specific content, the video conferencing application 360 receives such content with the video stream from the video conference provider 310. In order to determine the time zone-specific content, the video conference provider receives a time zone indication from each client device 330. The user may be provided with a means to opt-in or opt-out of providing the time zone indication. The user may also have the ability to manually override the time zone indication for purposes of accuracy, privacy, or other reasons.

For example, the client device 330 may access the data store 332 to determine the local time and time zone set for the operating system executing on client device 330. The time zone may be stored as an attribute of the video conferencing application 360. For instance, the user may enter the preferred time zone to use while setting up or using the video conferencing application 360. In some cases, the user may specify that a particular location be used, such as the user's office location, even when the user is working remotely. In other example systems, the video conferencing application 360 may access the operating system or other local resource to determine the time zone. For example, the video conference application 360 may execute a system method, determine the value of a system variable, access a file, such as an initialization (INI) file, or utilize some other mechanism for determining the time zone on the local operating system.

In another example, the client device 330 provides its internet protocol (IP) address to the video conferencing provider 310, which uses the IP address to determine a time zone indication associated with the client device 330. For instance, various publicly-available services provide a time zone associated with the general location associated with an IP address. For instance, the video conference provider 310 may provide the IP address to a web site such as ip-api.com. The web site responds with a JavaScript Object Notation (JSON) data-interchange format. Included in the JSON data is a time zone associated with the IP address. In such systems in which the user of the client device 330 utilizes a virtual private network (VPN), the video conference provider may need to utilize other means to confirm the time zone.

In other examples, the video conferencing provider 310 may utilize the mechanism that the client device 330 utilizes for determining the time zone. For example, the video conferencing provider 310 may utilize a mechanism such as Network Identity and Time Zone, which can be used by mobile devices to determine the current time zone in which they are located.

In another example system, the video conferencing application may provide the user's location as the time zone indication. For example, the user may enter a location into the video conferencing application settings. The location can then be provided to the video conference provider 360 in order to determine the time zone. One example of location might include the city and state or province in which the user is located. The video conferencing application 360 then provides that time zone indication to the video conference provider 310

The video conference provider 310 utilizes the time zone indication received from each of the plurality of users participating in the video conference to provide time zone content to the client devices along with the video streams.

The time zone content may take any of a number of forms. For example, the time zone content might include the difference in time between the time on the client device and on video streams from other client devices. In other words, if a first user viewing the video conference is in the eastern time zone of the United States of America, and a second user was participating from the pacific time zone, then the first user would see a "−3 hours" displayed as the time zone-specific content associated with the second user. And the second user would correspondingly see "+3 hours" associated with the video stream of the first user. In another example, the first user sees a time entry or clock associated with each of the other of the plurality of users of the video conference, where the time entry shows the current local time for the other participants. In other example systems, the time zone-specific content may include a greeting, such as "good morning" or "good evening." Such systems may utilize settings in the video conference application 436 to determine a user-specific language or languages in which to display the greeting.

In another example, the time-zone specific content may include an emoji, such as a sun or a moon, indicating whether it is daytime or night in the time zone of the other participants. In yet another example, the background of each of the participants may be varied to illustrate the same relationship. For example, an indication to override a user's default background by using a morning or afternoon scene as a background or to lighten or darken the user's existing background may be sent from the video conference provider 310 to the client device 330.

In example systems in which the location is sent as the time zone indication, the video conference provider 310 may provide location-specific information as part of the time zone-specific content. For instance, the video conference provider may provide a flag image or a flag identifier to be associated with each video stream. In one example, the video conference provider 31 may determine a weather condition, e.g., sunny, cloudy, or rainy, and send the weather information as the time zone-specific content to the video conferencing application 360 executing on the client device 330. For instance, a user may choose to show the local weather. In one such example system, a weather widget is then displayed under the local time in the user interface. While these examples are described in terms of a video conference, webinars and other types of video-enabled applications may also utilize such methods and systems.

Figure 4:
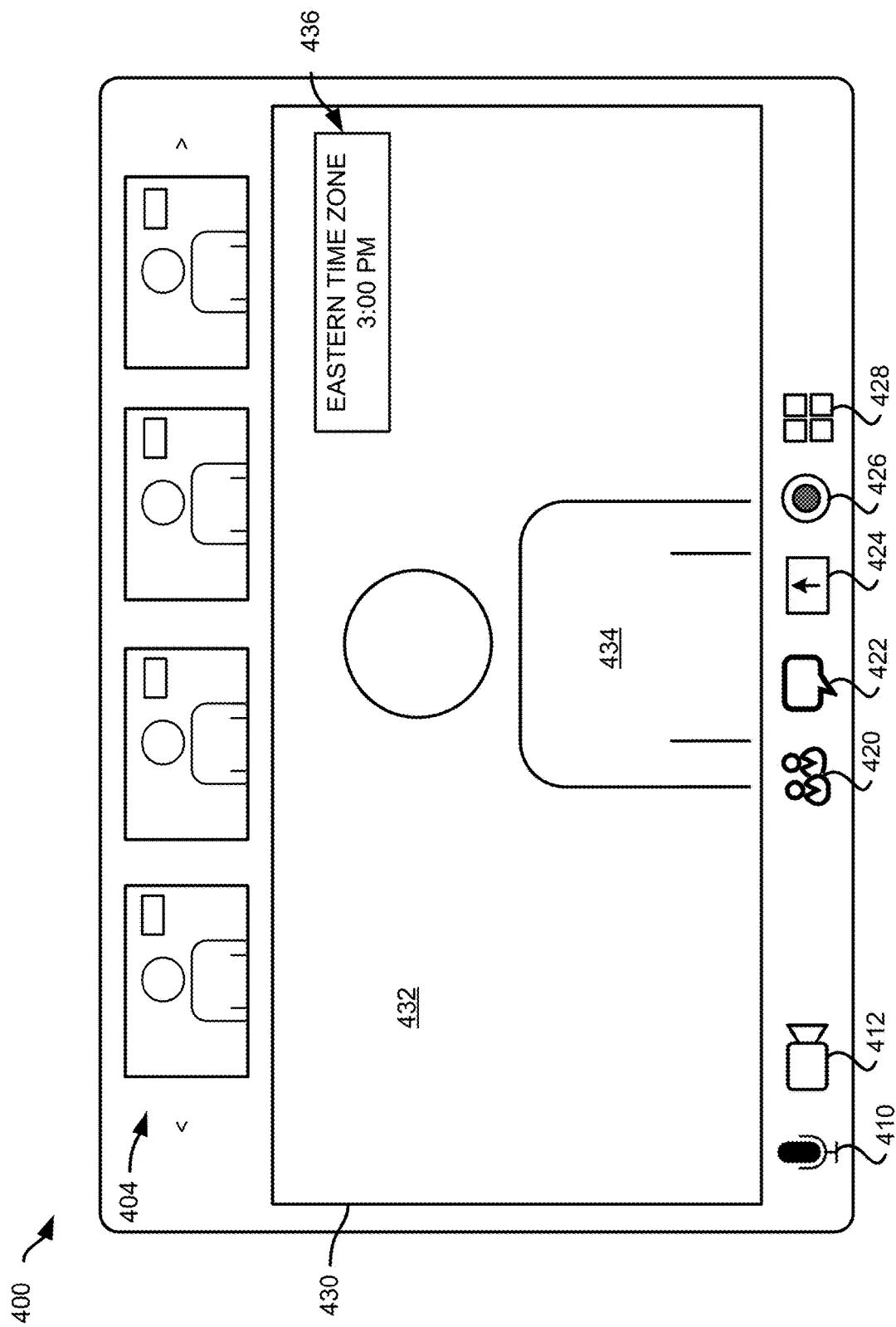
FIG. 4 shows an example graphical user interface ("GUI") for displaying time zone-specific content in video conferences.

Referring now to FIG. 4, FIG. 4 shows an example default GUI 400 presented to participants in a video conference. A client device, e.g., client device 330 or client devices 340a-n, executes a video conferencing application 360, which in turn displays the GUI 400 on the client device's display. In this example, the GUI 400 includes a speaker view window 430 that presents the current speaker 434 in the video conference. Above the speaker view window 430 are smaller participant windows 404, which allow the user to view some of the other participants in the video conference, as well as controls ("<" and ">") to let the host scroll to view other participants in the video conference.

Beneath the speaker view window 430 are a number of interactive elements 410-428 to allow the participant to interact with the video conferencing application. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room.

Referring to the speaker view window 430, in this example, it provides a view of the user 434 of client device 330, as captured by the camera 334, and a background 432. Included in the speaker view window 432 is a time zone content display field 436. The time zone content display field 436 displays the time zone content provided by the video conference provider 310. In the example shown, the time zone content display field 436 displays both the time zone, "Eastern Time Zone," along with the current time, "3:00 PM," where the speaker 434 is located. And while not labeled in FIG. 4, each of the other speaker windows illustrated 404 also includes a time zone content display field so that the user of the video conference application 360 can quickly determine the local time zone or relative time for those users.

Figure 5:
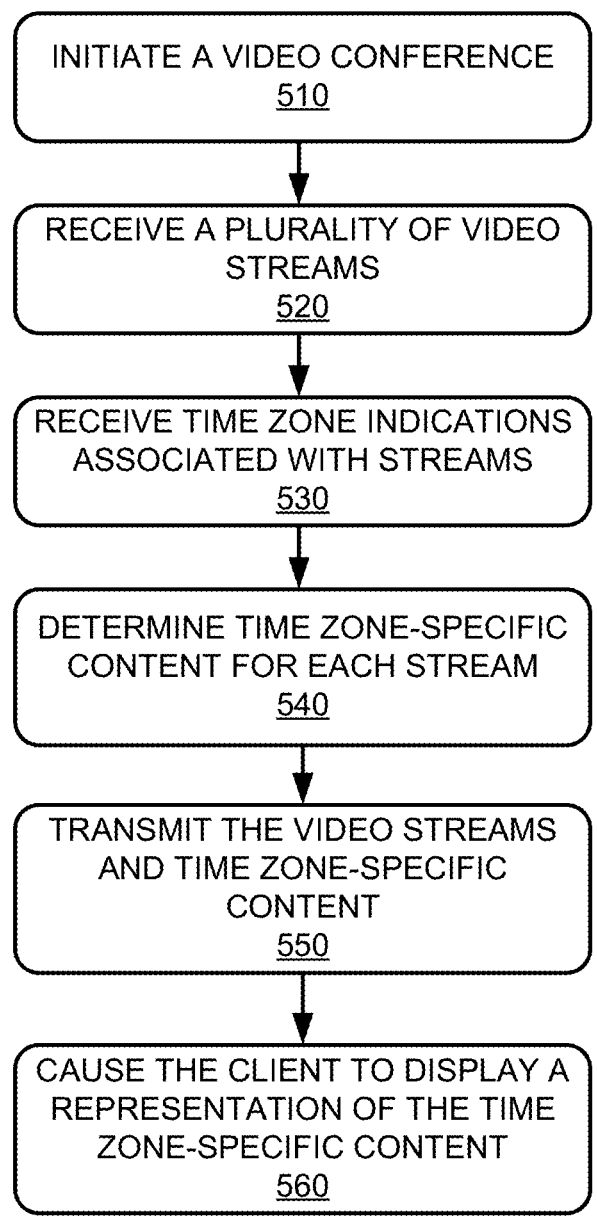
FIG. 5 shows an example method for displaying time zone-specific content in video conferences.

Referring to FIG. 5, FIG. 5 shows an example method for displaying time zone-specific content in video conferences. The example method 500 will be discussed with respect to the example system 300 shown in FIGS. 3A-3B and the GUI 400 shown in FIG. 4; however, any suitable system or GUI may be employed according to various examples.

At block 510, the user uses the video conferencing application 360 executed by their client device 330 to cause a video conference provider 310 to initiate a video conference, generally as discussed above with respect to FIGS. 1-2. Alternatively, or in addition, users use the video conferencing application to join video conferences that have previously been initiated.

At block 520, the video conferencing application 360 receives a plurality of video streams from a plurality of users participating in the video conference via client 310 or clients 340a-n. Each video stream includes input from the video camera 334 and microphone 336.

At block 530, the video conference provider 310 receives time zone indications from at least some of the participants in the video conference. In some examples, only some users may opt-in to provide such indications. In other examples, all users may provide time zone indications along with a video stream to the video conference provider 310. As described in relation to FIGS. 3A-3B, the time zone indication may be the time zone from the user's client device 310, a location of a user, the IP address of the client device 310, or any other data that indicates to the video conference provider 310 the time zone in which a particular video conference participant is located.

At block 540, the video conference provider 310 next determines the time zone-specific content to be associated with each video stream when that video stream is output to participants in the video conference. For example, the video conference provider may create a representation of a time zone, such as a clock, emoji, a flag, or a numerical time difference to be displayed to participants in a video conference. The representation of the time zone can then be sent as time zone-specific content to the video conference application 360 executing on the client device 310 and displayed in a time zone content display field 436, such as is illustrated in FIG. 4.

At block 550, the video conference provider transmits the video streams and time zone-specific video content to the participants of the video conference. In some examples, the time zone-specific video content may be combined with the video streams at the video conference provider 310 before it is transmitted to a client device 330. In other examples, the time zone-specific content is sent simultaneously with the video stream.

At block 560, the video conference provider 310 causes the client device 330 to display a representation of the time zone-specific content. For example, if the time zone-specific content is combined with or contained in the video stream, then the video conference application can simply display the video conference stream. In other examples, the video conference application 360 may display a visual layer over the video stream that incorporates the time zone-specific content or may use the time zone-specific content to otherwise vary the display such that the user viewing the display is able to determine the time zone of other participants in the video conference. For example, and as described above, the background of the speaker window 432 may be varied by increasing or decreasing the brightness based on the time zone-specific content or may be replaced by a background that reflects information about the time zone or is specific to the location of the speaker 434.

Figure 6:
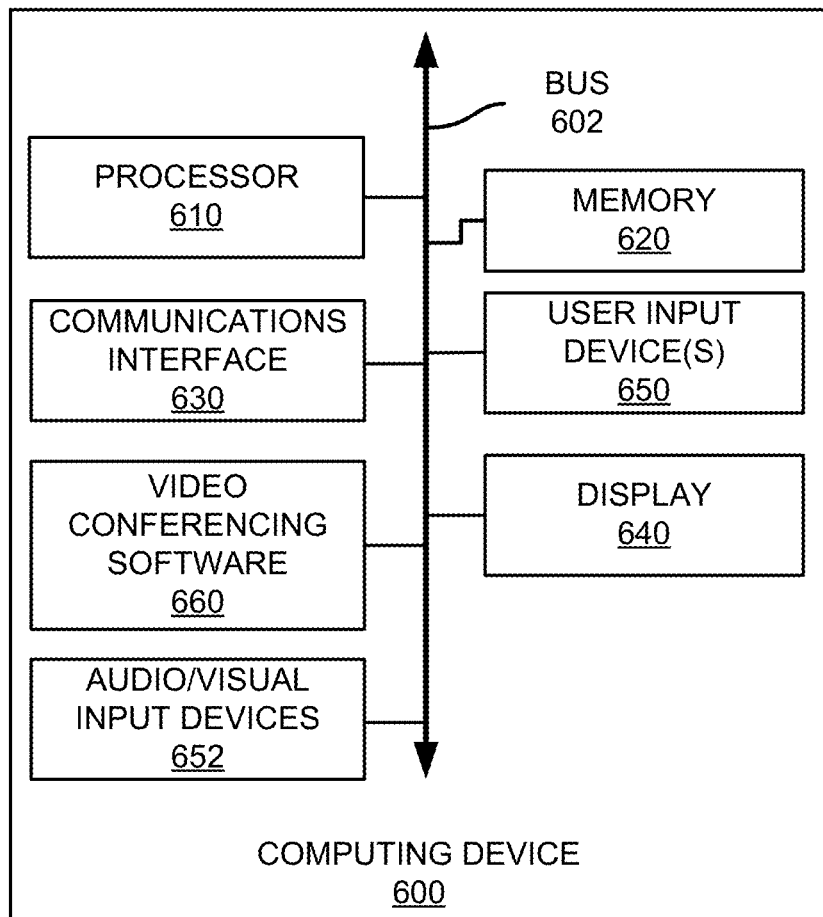
FIG. 6 shows an example computing device suitable for use with example systems and methods for displaying time zone-specific content in video conferences.

Referring now to FIG. 6, FIG. 6 shows an example computing device 600 suitable for use in example systems or methods for displaying time zone-specific content in video conferences according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for displaying time zone-specific content in video conferences according to different examples, such as part or all of the example method 500 described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes a video conferencing application 660 to enable a user to join and participate in a video conference, such as a conventional meeting or webinar, by receiving multimedia streams from a video conference provider, sending multimedia streams to the video conference provider, joining and leaving breakout rooms, presenting time-zone-specific content, etc. such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

The various examples described herein include systems, methods, and computer-readable media for displaying time zone-specific content in video conferences. In a first aspect, a method may include One example method includes initiating a video conference by a video conference provider, receiving, at the video conference provider, a plurality of video streams associated with the video conference, receiving, at the video conference provider, a plurality of time zone indications, each of the plurality of time zone indications associated with one of the plurality of video streams, determining, by the video conference provider, a time zone-specific content associated with each of the plurality of time zone indications, and transmitting the plurality of video streams and associated time zone-specific content to a plurality of client devices.

A second aspect may include the first aspect and also incorporate functionality causing a representation of the time zone-specific content associated with each of the plurality of video streams to be displayed in the video conference application executing on the client device.

A third aspect may include the first aspect or second aspect and also incorporate functionality wherein at least one of the plurality of time zone indications comprises a time zone attribute set on the client device or in a video conference application executing on the client device.

A fourth aspect may include any of the first through third aspects, and also include functionality wherein the time zone attribute comprises at least one of a current time or a current time zone.

A fifth aspect may include any of the first through fourth aspects and also include functionality wherein the time zone attribute comprises a location.

A sixth aspect may include any of the first through fifth aspects, and also include functionality wherein the time zone-specific content comprises a flag associated with the location.

A seventh aspect may include any of the first through sixth aspects, and also include functionality wherein at least one of the plurality of time zone indications comprises an internet protocol (IP) address and further comprising determining a time zone associated with the IP address.

An eighth aspect may include any of the first through seventh aspects, and also include functionality wherein determining the time zone-specific content comprises a numerical representation of the time zone.

A ninth aspect may include any of the first through eighth aspects, and also include functionality wherein the numerical representation of the time zone comprises the difference between a current time zone associated with the video stream and coordinated universal time (UTC).

In a tenth aspect, a non-transitory computer-readable medium includes processor-executable instructions configured to cause one or more processors to initiate a video conference by a video conference provider; receive, at the video conference provider, a plurality of video streams associated with the video conference; receive, at the video conference provider, a plurality of time zone indications, each of the plurality of time zone indications associated with one of the plurality of video streams; determine, by the video conference provider, a time zone-specific content associated with each of the plurality of time zone indications; and transmit the plurality of video streams and associated time zone-specific content to a plurality of client devices.

An eleventh aspect includes the tenth aspect and further includes functionality wherein the time zone-specific content comprises a representation of a clock.

A twelfth aspect includes the tenth or eleventh aspects, and further includes functionality wherein the time zone-specific content comprises a suggested greeting.

A thirteenth aspect includes any of the tenth through twelfth aspects, and further functionality wherein the suggested greeting is associated with a language, the language associated with one of the plurality of video streams.

A fourteenth aspect includes any of the tenth through thirteenth aspects, and further includes functionality wherein the time zone-specific content comprises an emoji.

In a fifteenth aspect, a device includes a communications interface; a non-transitory computer-readable medium; and one or more processors configured to execute processor-executable instructions stored in the non-transitory computer-readable medium to initiate a video conference by a video conference provider; receive, at the video conference provider, a plurality of video streams associated with the video conference; receive, at the video conference provider, a plurality of time zone indications, each of the plurality of time zone indications associated with one of the plurality of video streams; determine, by the video conference provider, a time zone-specific content associated with each of the plurality of time zone indications; and transmit the plurality of video streams and associated time zone-specific content to a plurality of client devices.

A sixteenth aspect includes the fifteenth aspect and also includes functionality wherein the time zone-specific content comprises a background associated with each of the plurality of time zone indications.

A seventeenth aspect includes the fifteenth through sixteenth aspects and also includes functionality wherein the background indicates a brightness level associated with at least the time zone indication.

An eighteenth aspect includes the fifteenth through seventeenth aspects and also includes functionality wherein the background indicates a weather indication associated with at least the time zone indication.

A nineteenth aspect includes the fifteenth through eighteenth aspects and also includes functionality wherein the background overrides a default background associated with each of the plurality of video streams.

A twentieth aspect includes the fifteenth through nineteenth aspects and also includes functionality wherein the background comprises one of a plurality of background images selected by a user of the video conferencing application.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   initiating a video conference by a video conference provider;
   receiving, at the video conference provider, a plurality of video streams associated with the video conference;
   receiving, at the video conference provider, a plurality of time zone indications, each of the plurality of time zone indications associated with one of the plurality of video streams, wherein at least a first one of the time zone indications is associated with a mobile device and at least a second one of the time zone indications is a manually-entered from a user;

determining, by the video conference provider, a time zone-specific content associated with each of the plurality of time zone indications; and transmitting the plurality of video streams and associated time zone-specific content to a plurality of client devices.

2. The method of claim 1, further comprising causing a representation of the time zone-specific content associated with each of the plurality of video streams to be displayed in the video conference application executing on the client device.

3. The method of claim 1, wherein at least one of the plurality of time zone indications comprises a time zone attribute set on the client device or in a video conference application executing on the client device.

4. The method of claim 2, wherein the time zone attribute comprises at least one of a current time or a current time zone.

5. The method of claim 2, wherein the time zone attribute comprises a location.

6. The method of claim 5, wherein the time zone-specific content comprises a flag associated with the location.

7. The method of claim 1, wherein at least one of the plurality of time zone indications comprises an internet protocol (IP) address and further comprising determining a time zone associated with the IP address.

8. The method of claim 1, wherein determining the time zone-specific content comprises a numerical representation of the time zone.

9. The method of claim 8, wherein the numerical representation of the time zone comprises the difference between a current time zone associated with the video stream and coordinated universal time (UTC).

10. A non-transitory computer-readable medium comprising processor-executable instructions configured to cause one or more processors to:

initiate a video conference by a video conference provider;

receive, at the video conference provider, a plurality of video streams associated with the video conference;

receive, at the video conference provider, a plurality of time zone indications, each of the plurality of time zone indications associated with one of the plurality of video streams, wherein at least a first one of the time zone indications is associated with a mobile device and at least a second one of the time zone indications is a manually-entered override from a user;

determine, by the video conference provider, a time zone-specific content associated with each of the plurality of time zone indications; and transmit the plurality of video streams and associated time zone-specific content to a plurality of client devices.

11. The non-transitory computer-readable medium of claim 10, wherein the time zone-specific content comprises a representation of a clock.

12. The non-transitory computer-readable medium of claim 10, wherein the time zone-specific content comprises a suggested greeting.

13. The non-transitory computer-readable medium of claim 10, wherein the suggested greeting is associated with a language, the language associated with one of the plurality of video streams.

14. The non-transitory computer-readable medium of claim 10, wherein the time zone-specific content comprises an emoji.

15. A device comprising:

a communications interface;

a non-transitory computer-readable medium; and one or more processors configured to execute processor-executable instructions stored in the non-transitory computer-readable medium to:

initiate a video conference by a video conference provider;

receive, at the video conference provider, a plurality of video streams associated with the video conference;

receive, at the video conference provider, a plurality of time zone indications, each of the plurality of time zone indications associated with one of the plurality of video streams, wherein at least a first one of the time zone indications is associated with a mobile device and at least a second one of the time zone indications is a manually-entered override by a user;

determine, by the video conference provider, a time zone-specific content associated with each of the plurality of time zone indications; and transmit the plurality of video streams and associated time zone-specific content to a plurality of client devices.

16. The device of claim 15, wherein the time zone-specific content comprises a background associated with each of the plurality of time zone indications.

17. The device of claim 16, wherein the background indicates a brightness level associated with at least the time zone indication.

18. The device of claim 16, wherein the background indicates a weather indication associated with at least the time zone indication.

19. The device of claim 16, wherein the background overrides a default background associated with each of the plurality of video streams.

20. The device of claim 16, wherein the background comprises one of a plurality of background images selected by a user of the video conferencing application.

* * * * *